(12) United States Patent
O'Krafka et al.

(10) Patent No.: US 8,103,165 B2
(45) Date of Patent: Jan. 24, 2012

(54) COLLISION DETECTION SCHEME FOR OPTICAL INTERCONNECTS

(75) Inventors: Brian W. O'Krafka, Austin, TX (US); Pranay Koka, Austin, TX (US); John E. Cunningham, San Diego, CA (US); Ashok Krishnamoorthy, San Diego, CA (US); Xuezhe Zheng, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 734 days.

(21) Appl. No.: 12/176,293

(22) Filed: Jul. 18, 2008

(65) Prior Publication Data

US 2010/0014852 A1 Jan. 21, 2010

(51) Int. Cl.
*H04B 10/08* (2006.01)
*H04B 17/00* (2006.01)
(52) U.S. Cl. .......................................... 398/36; 398/30
(58) Field of Classification Search ............... 398/25, 398/30, 36
See application file for complete search history.

(56) References Cited

U.S. PATENT DOCUMENTS

| | | | | |
|---|---|---|---|---|
| 4,580,872 A | * | 4/1986 | Bhatt et al. ................ | 398/99 |
| 4,809,264 A | * | 2/1989 | Abraham et al. ............ | 370/489 |
| 5,602,663 A | * | 2/1997 | Hamaguchi et al. .......... | 398/79 |

OTHER PUBLICATIONS

Chae, C., Wong, E., and Tucker, R. S., Optical CSMA/CD Media Access Scheme for Ethernet Over Passive Optical Network, IEEE Photonic Technology Letters, May 2002, 3 pages.

Desai, B. N., An Optical Implementation of a Packet-Based (Ethernet) MAC in a WDM Passive Optical Network Overlay, Mar. 2001, 3 pages.

Qin, X. and Yang, Y., Nonblocking WDM Switching Networks With Full and Limited Wavelength Conversion, IEEE Transactions on Communications, Dec. 2002, 10 pages.

Yang, Y. and Wang, J., Designing WDM Optical Interconnects with Full Connectivity by Using Limited Wavelength Conversion, IEEE Transactions on Computers, Dec. 2004, 10 pages.

Shacham, A., Bergman, K., and Carloni, L. P., On the Design of a Photonic Network-on-Chip, First International Symposium on Networks-on-Chip, May 2007, 12 pages.

* cited by examiner

*Primary Examiner* — Nathan Curs
(74) *Attorney, Agent, or Firm* — Osha • Liang LLP

(57) ABSTRACT

A method of detecting transmission collisions in an optical data interconnect system. The method includes initiating a data transmission of a data signal from a transmitting node over the optical data channel, transmitting a first collision detect signal from the transmitting node throughout a duration of the data transmission where the first collision detect signal is transmitted over an optical detection channel corresponding to the transmitting node, monitoring at the transmitting node of the optical data interconnect system for a predetermined period of time, where the optical data interconnect system further includes optical collision detection channels corresponding to each of a plurality of receiving nodes and one or more remaining nodes, and identifying a transmission collision when a second collision signal is received through one of the optical collision detection channels at the transmitting node during the predetermined period of time.

20 Claims, 6 Drawing Sheets

COLLISION DETECTION SCHEME FOR OPTICAL INTERCONNECTS

CROSS REFERENCE TO RELATED APPLICATION

This application claims is related to U.S. patent application Ser. No. 12/176,294, entitled "ARBITRATION SCHEME FOR AN OPTICAL BUS", with the same inventors and filed on the same day as this application.

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place different sets of constraints on designers in comparison to single processor systems. For example, because each processor may be working on an independent task, many more requests to memory, or other processors, may be required. It may also be necessary to share information among the processors. Accordingly, the input/output ("I/O") bandwidth requirements for a system with multiple processors may be much higher than for a single processor system.

SUMMARY OF THE INVENTION

In general, one or more aspects of the invention involve a method of detecting transmission collisions in an optical data interconnect system. The method involves initiating a data transmission of a data signal from the transmitting node over the optical data channel, transmitting a first collision detect signal from the transmitting node throughout a duration of the data transmission wherein the first collision detect signal is transmitted over an optical detection channel corresponding to the transmitting node, monitoring at the transmitting node of the optical data interconnect system for a predetermined period of time, wherein the optical data interconnect system further comprises a plurality of optical collision detection channels corresponding to each of the plurality of receiving nodes and the one or more remaining nodes, and identifying a transmission collision when a second collision signal is received through one of the plurality of optical collision detection channels at the transmitting node during the predetermined period of time.

In general, one or more aspects of the invention involve a system for transmitting a data signal within an optical data interconnect system. The system includes an optical data channel connecting a transmitting node, a plurality of receiving nodes, and one or more remaining nodes and configured to transmit the data signal from the transmitting node, a plurality of optical collision detection channels, each with a channel width of at least one bit and configured to transmit a first collision detect signal from the transmitting node throughout a duration of a data transmission, wherein each of the plurality of collision detection channels corresponds to each of the plurality of receiving nodes, and the one or more remaining nodes, and a detection module configured to monitor at the transmitting node of the optical data interconnect system for a predetermined period of time, and identify a transmission collision when a second collision signal is received through one of the plurality of optical collision detection channels at the transmitting node during the predetermined period of time.

In general, one or more aspects of the invention involve a system for transmitting a data signal within an optical data interconnect system. The system includes a first optical data channel connecting a transmitting node and one or more remaining nodes and configured to transmit the data signal from the transmitting node, an optical splitter configured to split the first optical data channel, a second optical data channel connecting a plurality of receiving nodes to the first optical data channel through the optical splitter, a plurality of optical collision detection channels, each with a channel width of at least one bit and configured to transmit a first collision detect signal from the transmitting node throughout a duration of a data transmission, wherein each of the plurality of collision detection channels corresponds to each of the one or more remaining nodes, and a detection module configured to monitor at the transmitting node of the optical data interconnect system for a predetermined period of time, and identify a transmission collision when a second collision signal is received through one of the plurality of optical collision detection channels at the transmitting node during the predetermined period of time.

Other aspects and advantages of the invention will be apparent from the following description and the appended claims.

DETAILED DESCRIPTION

Generally, embodiments of the disclosed invention relate to a system for and method of detecting data collisions in a system in which multiple processors, or nodes, may share information with each other over shared optical channels.

Specific details of the present disclosure will now be described in detail with reference to the accompanying figures.

Figure 1:
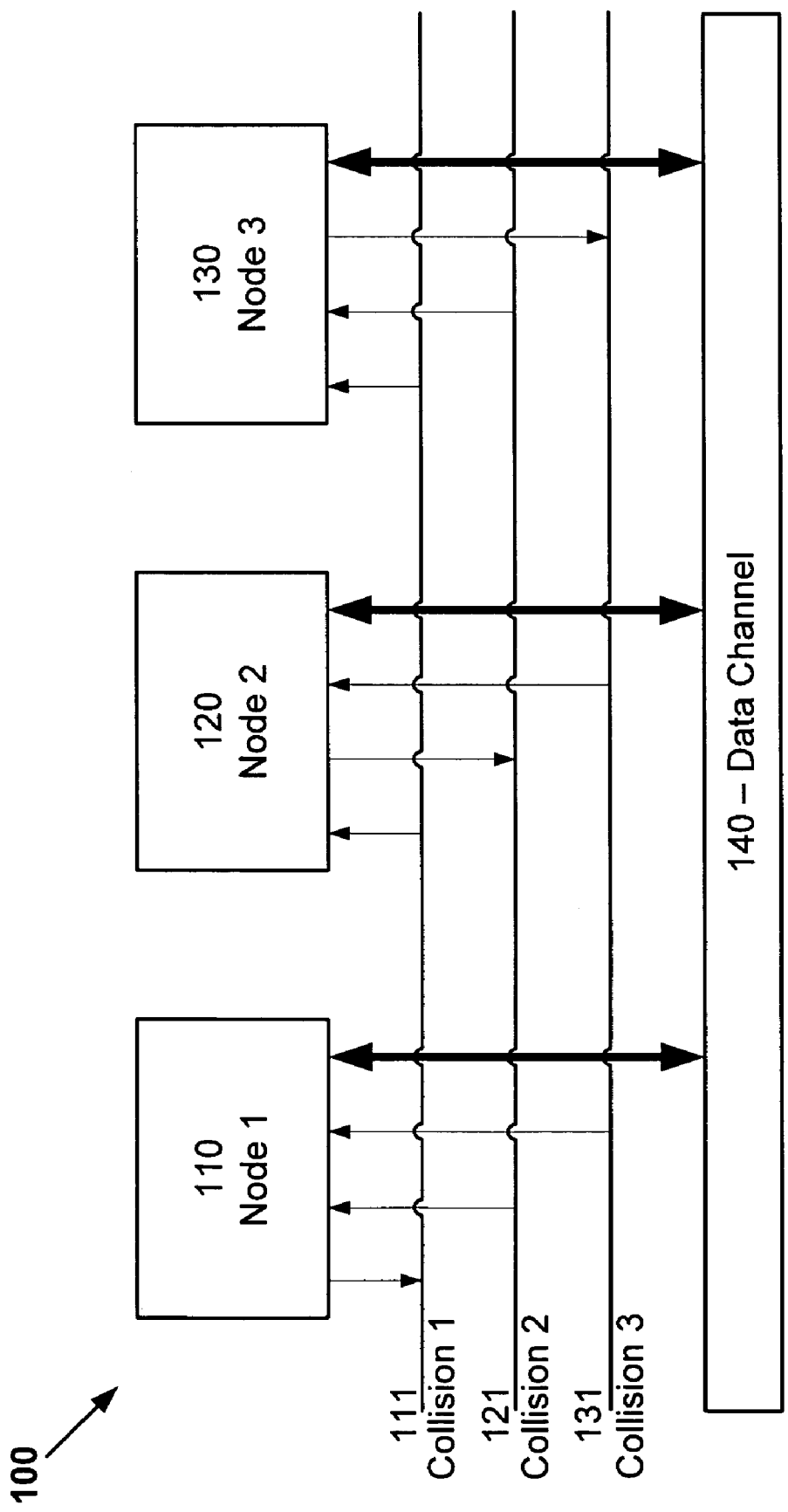
FIG. 1 shows an optical data interconnect system in accordance with one or more embodiments disclosed herein.

Referring now to FIG. 1, an optical data interconnect system 100 including three nodes (e.g., node 1 110, node 2 120, and node 3 130) and a data channel 140 is shown in accordance with one or more embodiments of the invention. In one or more embodiments of the invention, each of the nodes 110, 120, and 130 are able to transmit data signals to and receive data signals from each of the other nodes over the data channel 140. Because the data channel 140 is shared among each of the nodes 110, 120, and 130, data collisions, where two nodes attempt to transmit data signals simultaneously, may occur. Accordingly, in one or more embodiments of the invention, the optical data interconnect system 100 includes three optical collision detection channels (e.g., collision 1 111, collision 2 121, and collision 3 131), which correspond to the nodes 110, 120, and 130, respectively.

Each of the nodes 110, 120, and 130 may be, for example, a processor in a larger computing system. Alternatively, each of the nodes may be separate processors or dies disposed on a single macrochip. In order to maximize transmission bandwidth among the nodes 110, 120, and 130, data signals may be transmitted optically. Accordingly, the data channel 140 may be, for example, an optical waveguide capable of transmitting many optical wavelengths, and, therefore, many bits of information in a multiplexed scheme. The three optical collision detection channels 111, 121, and 131 may also be an optical waveguide. In one or more embodiments of the invention, the three optical collision detection channels 111, 121, and 131 are each single bit channels.

Figure 2A:
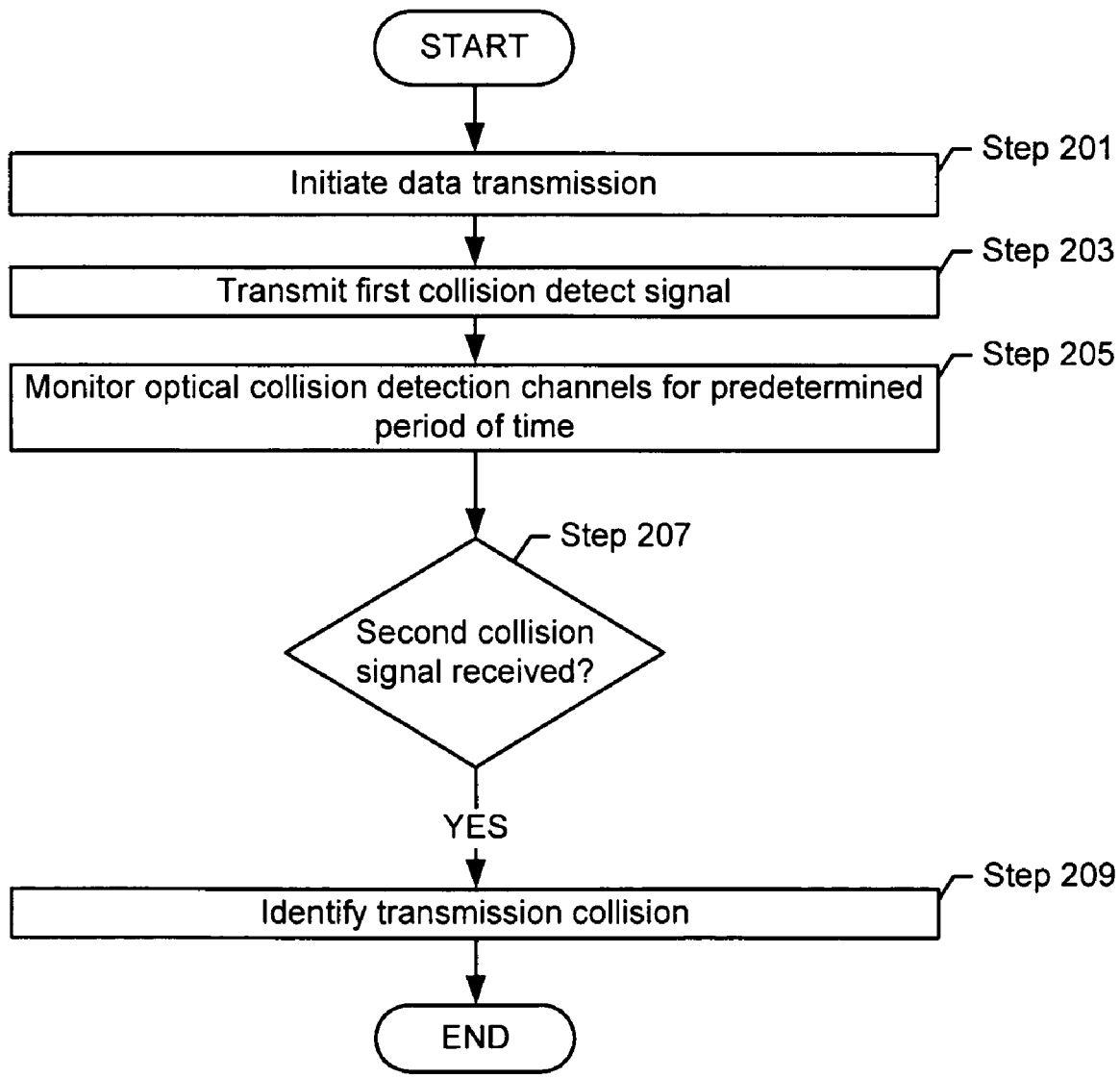
FIG. 2(a) shows a flow chart of a method of detecting transmission collisions in accordance with one or more embodiments disclosed herein.
Figure 2B:
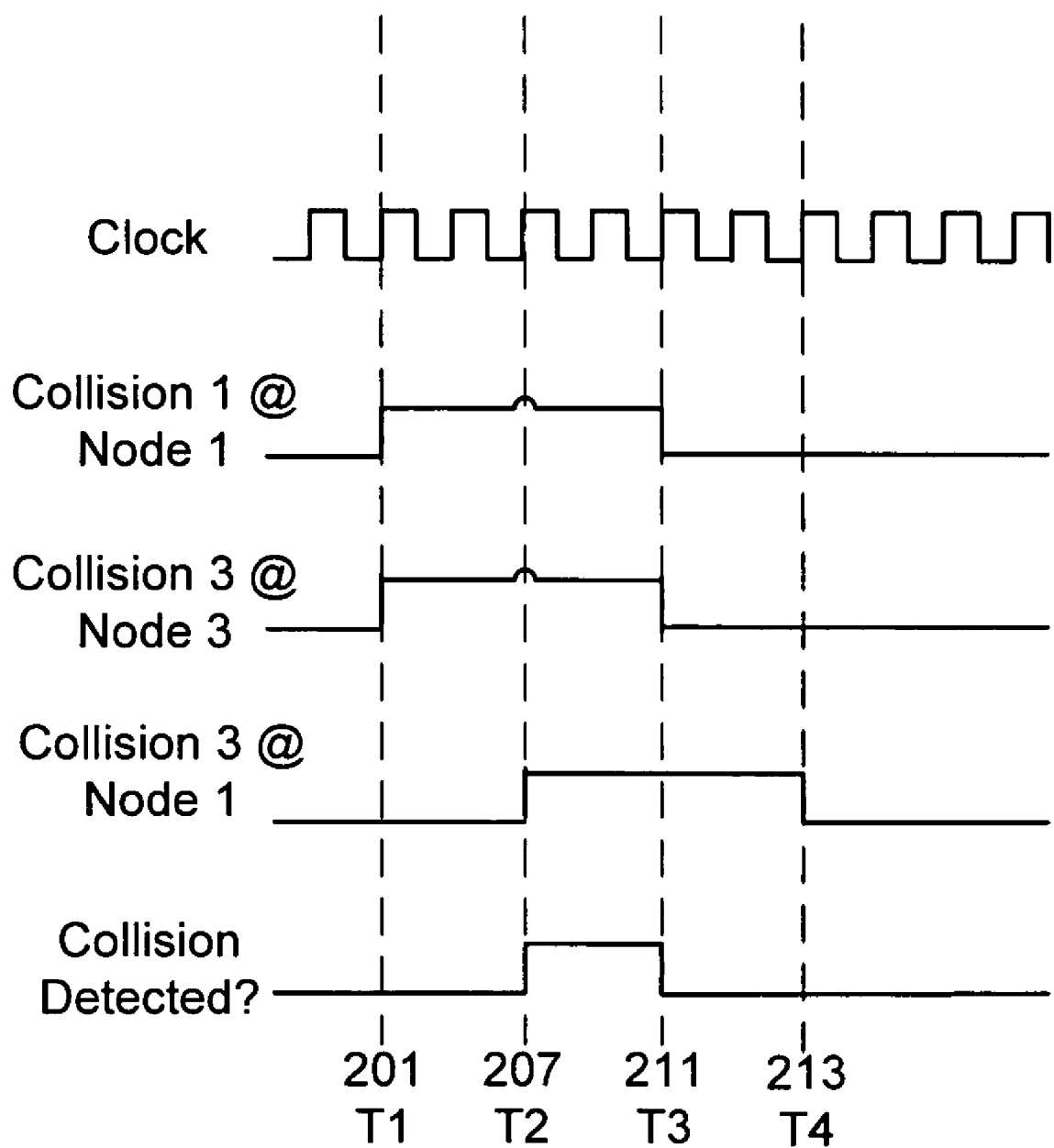
FIG. 2(b) shows a timing diagram in accordance with one or more embodiments disclosed herein.

Referring now to FIG. 2(*a*), a method of detecting data collisions within the optical data interconnect scheme is shown in accordance with one or more embodiments of the invention. First, in step 201, a node initiates a data transmission over the optical interconnect system 100 in accordance with one or more embodiments of the invention. For example, Node 1 110 initiates a data transmission over the optical data channel 140 that is addressed to Node 2 120. Simultaneously, in step 203, Node 1 110 transmits a first collision detect signal over the optical detection channel 111 that corresponds to Node 1 in accordance with one or more embodiments of the invention. The first collision detect signal indicates to the remaining nodes 120 and 130 that Node 1 110 is transmitting a data signal over the optical data channel 140. However, because the first collision detect signal takes some amount of time to reach the remaining nodes 120 and 130, Node 1 110 cannot be sure that the first collision detect signal alone will prevent a data collision.

Accordingly, in step 205, a detection module within Node 1 110 monitors the optical collision detection channels 121 and 131 corresponding to the remaining nodes 120 and 130 for a predetermined period of time in accordance with one or more embodiments of the invention. The predetermined period of time may, for example, be greater than or equal to minimum size of a data signal, which is equivalent to the maximum round trip latency of the optical collision detection channels. In one or more embodiments of the invention, Step 207 indicates that the detection module only proceeds if a second collision detect signal is received within the predetermined period of time. Finally, in step 209, the detection module identifies that a transmission collision has occurred if a second collision detect signal was received within the predetermined period of time in accordance with one or more embodiments of the invention. The detection module may also issue a backoff signal indicating that Node 1 110 needs to retransmit. Node 1 110 may, for example, backoff for a random period of time and initiate the desired transmission to Node 2 120 after the random period of time has expired.

Referring now to FIG. 2(*b*), a timing diagram based on the example discussed above with respect to FIG. 2(*a*) is shown. At time T1 201, Node 1 initiates a data transmission to Node 2 and transmits the first collision detect signal Collision 1 in accordance with one or more embodiments of the invention. Simultaneously, Node 3 initiates a data transmission and transmits the second collision detect signal Collision 3 in accordance with one or more embodiments of the invention. However, the second collision detect signal takes time to propagate from Node 3 to Node 1. This example assumes that the propagation delay between the two nodes is two clock cycles. Thus, two clock cycles later at time T2 207, the second collision detect signal reaches Node 1, and the detection module within Node 1 identifies that a data collision occurred and the transmission must be reinitiated in accordance with one or more embodiments of the invention. Similarly, the first collision detect signal propagates to Node 3, and a detection module within Node 3 generates a backoff signal indicating that Node 3 must backoff and reinitiate its transmission in accordance with one or more embodiments of the invention.

Figure 3:
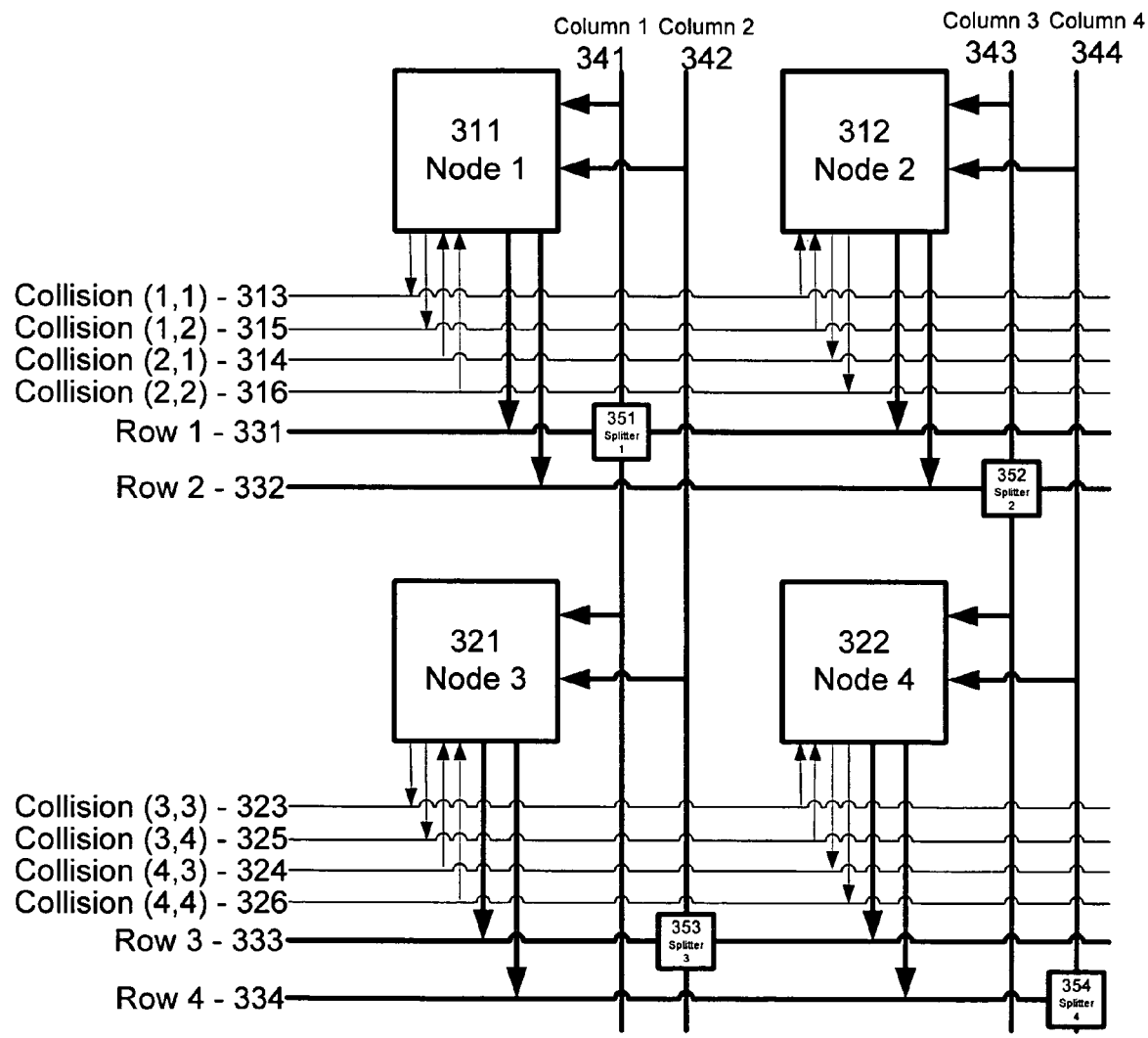
FIGS. 3 and 4 show an optical data interconnect system in accordance with embodiments disclosed herein.

Referring now to FIG. 3, an optical data interconnect system 300 including four nodes (e.g., node 1 311, node 2 312, node 3 321, and node 4 322) is shown in accordance with one or more embodiments of the invention. In one or more embodiments of the invention, the four nodes 311, 312, 321, and 322 are laid out in a grid formation, with nodes 311 and 312 forming a first row and nodes 321 and 322 forming a second row. Nodes 311 and 321 form a first column, and nodes 312 and 322 form a second column. Optical data channel rows 331, 332, 333, and 334 connect nodes that lie in the same rows, and optical data channel columns 341, 342, 343, and 344 connect nodes that lie in the same columns in accordance with one or more embodiments of the invention. As discussed above with respect to FIG. 1, data signals may be transmitted among the nodes over the optical data rows and columns.

Based on the configuration shown in FIG. 3, data is transmitted from a transmitting node over an optical data channel row, and received at a receiving node over an optical data channel column in accordance with one or more embodiments of the invention. Accordingly, in one or more embodiments of the invention, four optical splitters 351, 352, 353, and 354 join the four optical channel rows with the four optical data channel columns. In one or more embodiments of the invention, each of the optical splitters 351, 352, 353, and 354 splits an optical data signal transmitted from either direction on the corresponding row, and transmits the optical data signal in either direction on the corresponding column. The configuration shown in FIG. 3 allows each of the four nodes 311, 312, 321, and 322 to transmit data to each of the remaining nodes over shared data connections in accordance with one or more embodiments of the invention.

In order to transmit a signal to a receiving node, a transmitting node transmits a data signal on the row that is joined by a splitter to one of the columns that connects to the receiving node. Thus, each of the optical data channel rows 331, 332, 333, and 334, and the corresponding columns 341, 342, 343, and 344 are shared by two nodes in accordance with one or more embodiments of the invention. For example, in order for Node 2 312 to transmit a data signal to Node 3 321, Node 2 312 initiates a data transmission addressed to Node 3 321 on Row 1 331, which is split by splitter 351 to join Column 1 341. Node 3 321 receives signals directly from Column 1 341, so Node 1 and Node 3 are effectively connected. However, in order for Node 1 311 to transmit a data signal to Node 3 321, Node 1 311 would also initiate a data transmission addressed to Node 3 321 on Row 1 331. Thus, Row 1 331 and Column 1 341 are shared between Node 1 311 and Node 2 312, and collisions may occur if the two nodes attempt to transmit data to Node 3 321 simultaneously. Further, Row 2 332 and Column 3 343 are shared between Node 1 311 and Node 2 312, and collisions may occur if the two nodes attempt to transmit data to Node 4 322 simultaneously.

Accordingly, the configuration shown in FIG. 3 further includes optical collision detection channels 313-316 and 323-326, each of which corresponds to a specific node and a specific row in accordance with one or more embodiments of the invention. For example, Collision (1,1) 313 corresponds to Node 1 311 and Row 1 331, and if Collision (1,1) 313 is asserted high, Node 1 311 is transmitting over Row 1 331. As discussed above with respect to FIG. 1, each of the nodes includes a detection module to monitor the remaining optical collision detection channels in order to determine whether a data collision has occurred during transmission in accordance with one or more embodiments of the invention. For example, if Node 3 321 attempts to transmit a data signal to Node 2 312 over Row 4 334, Node 3 321 asserts high on Collision (3,4) 325 during transmission, and monitor Collision (4,4) 326 for a predetermined period of time to ensure that Node 4 322 did not attempt to transmit simultaneously, thereby creating a data collision.

Figure 4:
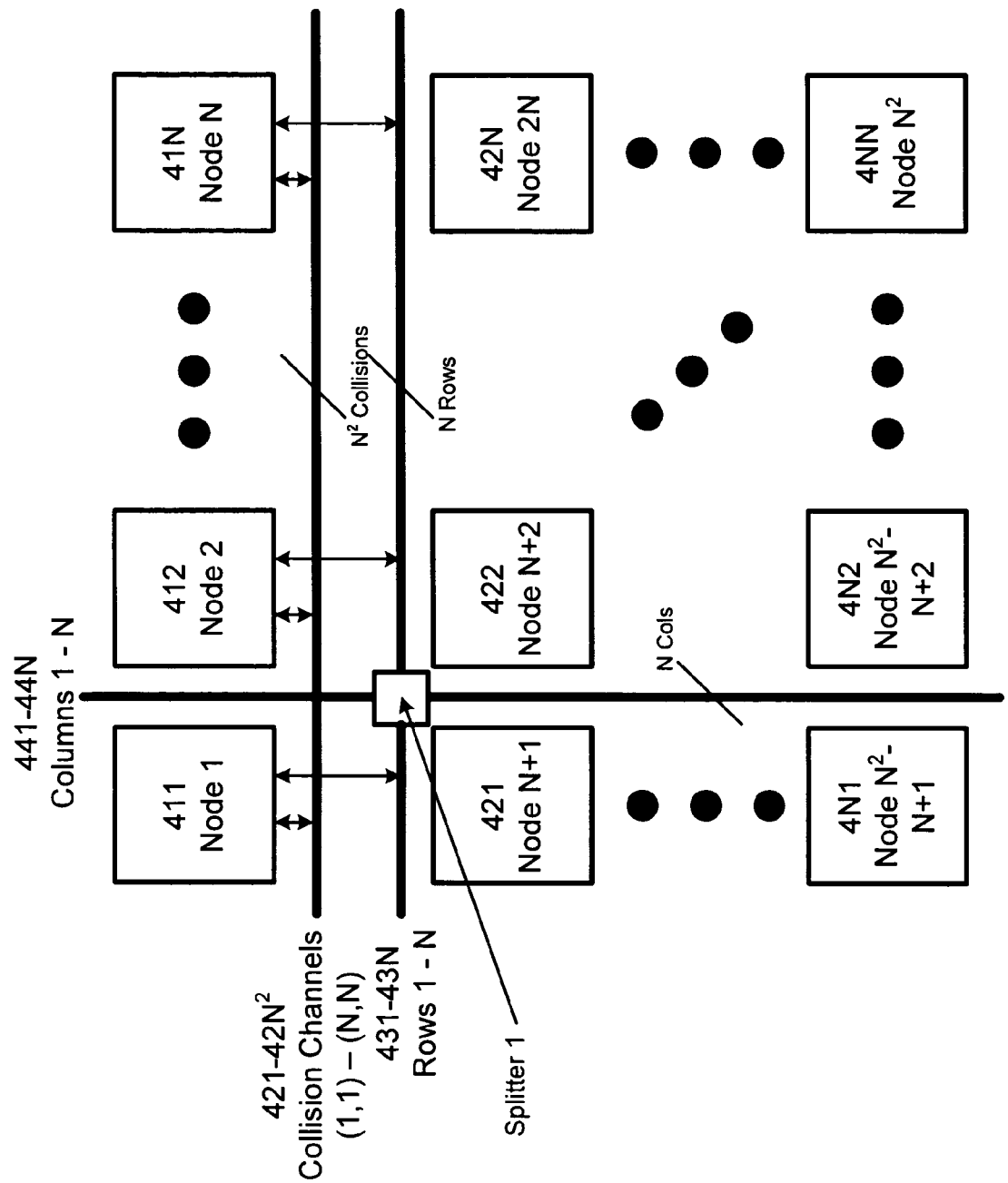

Referring now to FIG. 4, a generalized N×N grid analogous to the 2×2 grid shown in FIG. 3 is shown in accordance with one or more embodiments of the invention. The generalized N×N grid includes $N^2$ nodes arranged in N rows and N columns. Each of the N rows includes N optical data channel rows corresponding to each of the N columns. Each of the N optical data channel rows is connected to a corresponding optical data channel column through a splitter. Thus, there is one splitter at each of these junctions, and $N^2$ splitters total, though only one such junction is shown in FIG. 4. The generalized layout requires $N^2$ optical data collision channels per row, and $N^2$ optical data channels in total. Note that individual nodes may be missing from the layout without affecting the overall optical data interconnect scheme. Though the generalized N×N grid may include many more nodes, the methods of transmitting data signals and detecting transmission collisions are analogous to the examples discussed above with respect to FIG. 3.

Figure 5:
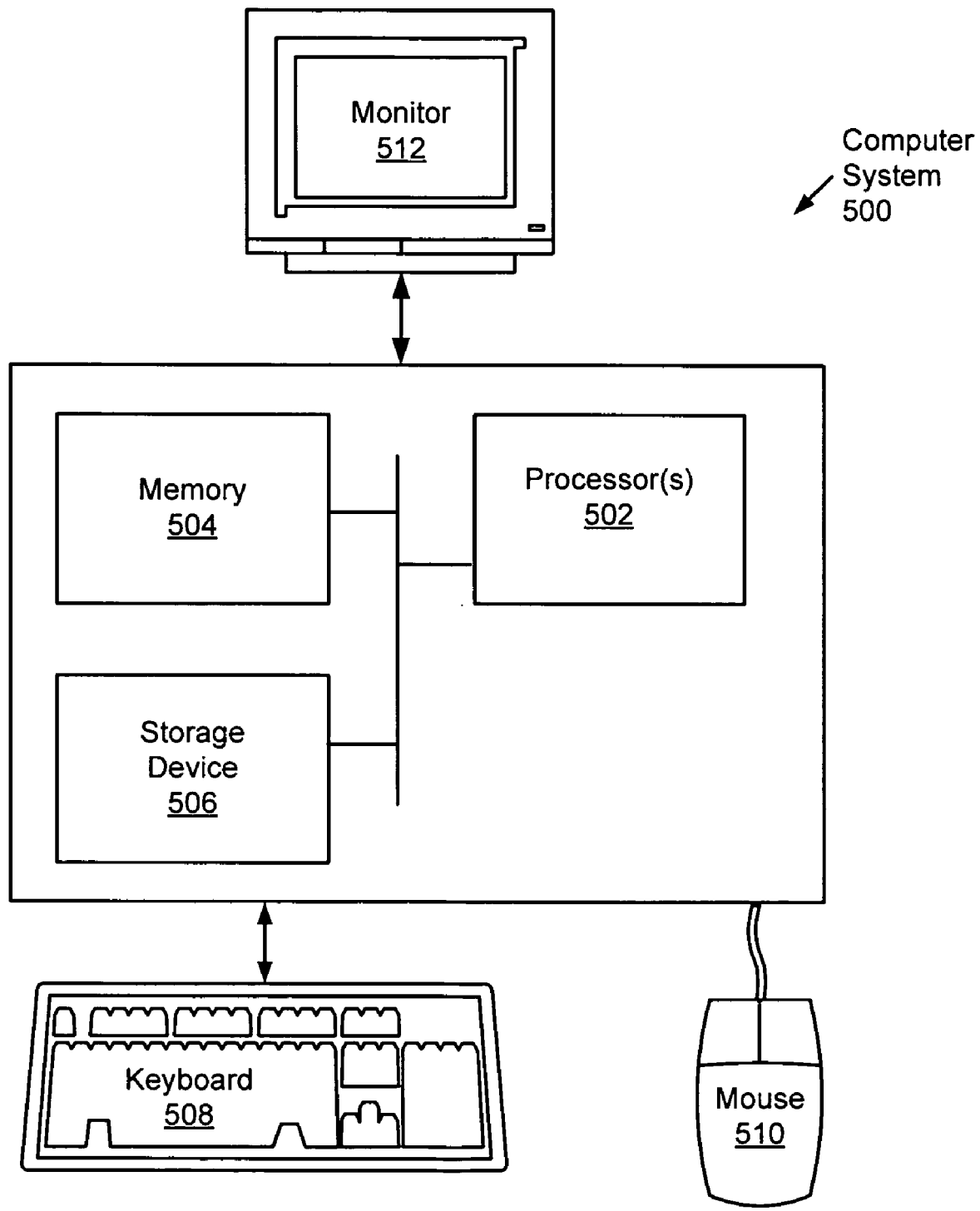
FIG. 5 shows a computer system in accordance with one or more embodiments disclosed herein.

Referring now to FIG. 5, portions of the invention may be implemented in software, such as, for example, the detection modules discussed above with respect to FIGS. 1 and 3. These portions of the invention may be implemented on virtually any type of computer regardless of the platform being used. For example, as shown in FIG. 5, a computer system 500 includes a processor 502, associated memory 504, a storage device 506, and numerous other elements and functionalities typical of today's computers (not shown). The computer system 500 may also include input means, such as a keyboard 508 and a mouse 510, and output means, such as a monitor 512. The computer system 500 is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system 500 may be located at a remote location and connected to the other elements over a network.

Further, portions of the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a computer readable medium such as a compact disc (CD), a diskette, a tape, a file, or any other computer readable storage device. Further, one or more embodiments of the invention may be implemented as an Application Program Interface (API) executing on a computer system(s), where the API includes one or more software instructions.

Embodiments of the optical data interconnect scheme disclosed herein may exhibit one or more of the following advantages. The optical data interconnect system disclosed herein may detect and account for optical data collisions without requiring a separate arbiter. Further, the optical data interconnect system disclosed herein may detect optical data collisions while requiring a minimal amount of additional bandwidth. The optical data interconnect system disclosed herein may also allow for data transmissions without blocking any node from transmitting or requiring any node to wait for permission to transmit. The optical data interconnect system disclosed herein has a symmetrical and uniform design, which may simplify fabrication processes. The optical data interconnect system disclosed herein may also provide low serialization delays and low latency of transmission between nodes.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method of detecting transmission collisions in an optical data interconnect system comprising a transmitting node, a plurality of receiving nodes, and a plurality of remaining nodes connected through an optical data channel, comprising:
   initiating a data transmission of a data signal from the transmitting node over the optical data channel;
   transmitting a first collision detect signal from the transmitting node throughout a duration of the data transmission, wherein the first collision detect signal is transmitted over an optical collision detection channel corresponding to the transmitting node;
   monitoring at the transmitting node of the optical data interconnect system for a predetermined period of time, wherein the optical data interconnect system further comprises a plurality of optical collision detection channels corresponding to each of the plurality of remaining nodes; and
   identifying a transmission collision when a second collision detect signal is received through one of the plurality of optical collision detection channels at the transmitting node during the predetermined period of time.

2. The method of claim 1, further comprising:
   ceasing the data transmission for a random period of time if the transmission collision is identified during the predetermined period of time; and
   re-initiating the data transmission following ceasing the data transmission for the random period of time.

3. The method of claim 1, wherein transmitting the first collision detect signal comprises transmitting a single bit of information.

4. The method of claim 1, wherein transmitting the data signal occurs over the predetermined period of time.

5. The method of claim 1, wherein the predetermined period of time is at least a maximum roundtrip latency of the plurality of optical collision detection channels.

6. The method of claim 1, further comprising:
   generating a backoff signal indicating that the transmission collision occurs if the transmission collision is identified during the predetermined period of time.

7. A system for transmitting a data signal within an optical data interconnect system, comprising:
   an optical data channel connecting a transmitting node, a plurality of receiving nodes, and a plurality of remaining nodes and configured to initiate a data transmission of the data signal from the transmitting node;
   an optical collision detection channel corresponding to the transmitting node and configured to transmit a first collision detect signal from the transmitting node throughout a duration of the data transmission;

a plurality of optical collision detection channels corresponding to each of the plurality of remaining nodes; and a detection module configured to:

monitor at the transmitting node of the optical data interconnect system for a predetermined period of time, and identify a transmission collision when a second collision detect signal is received through one of the plurality of optical collision detection channels at the transmitting node during the predetermined period of time.

8. The system of claim 7, wherein each of the plurality of optical collision detection channels and the optical data channel comprises an optical waveguide.

9. The system of claim 7, wherein the predetermined period of time is at least a maximum roundtrip latency of the plurality of optical collision detection channels.

10. The system of claim 7, wherein each of the transmitting node, the plurality of receiving nodes, and the plurality of remaining nodes are disposed on a single macrochip.

11. The system of claim 7, wherein the detection module is further configured to generate a backoff signal indicating that the transmission collision occurs if the transmission collision is identified during the predetermined period of time.

12. A system for transmitting a data signal within an optical data interconnect system, comprising:

a first optical data channel connecting a transmitting node and a plurality of remaining nodes and configured to initiate a data transmission of the data signal from the transmitting node;

an optical splitter configured to split the first optical data channel;

a second optical data channel connecting a plurality of receiving nodes to the first optical data channel through the optical splitter;

an optical collision detection channel corresponding to the transmitting node and configured to transmit a first collision detect signal from the transmitting node throughout a duration of the data transmission;

a plurality of optical collision detection channels corresponding to each of the plurality of remaining nodes;

a detection module configured to:

monitor at the transmitting node of the optical data interconnect system for a predetermined period of time, and identify a transmission collision when a second collision detect signal is received through one of the plurality of optical collision detection channels at the transmitting node during the predetermined period of time.

13. The system of claim 12, wherein the transmitting node, the plurality of receiving nodes, and the plurality of remaining nodes within the optical data interconnect system are arranged in a grid pattern comprising a plurality of rows of nodes and a plurality of columns of nodes.

14. The system of claim 12, wherein a total number of optical detection channels depends on a total number of rows of nodes and a total number of columns of nodes.

15. The system of claim 12, wherein the plurality of receiving nodes comprises a column of nodes.

16. The system of claim 15, wherein the transmitting node and the plurality of remaining nodes comprise a row of nodes.

17. The system of claim 16, wherein the first optical channel connects each node of the row of nodes, and the second optical channel connects each node of the column of nodes.

18. The system of claim 12, wherein each of the first optical data channels, each of the second optical data channels, and the plurality of optical collision detection channels comprise an optical waveguide.

19. The system of claim 12, wherein the predetermined period of time is at least a maximum roundtrip latency of the plurality of optical collision detection channels.

20. The system of claim 12, wherein the detection module is further configured to generate a backoff signal indicating that the transmission collision occurs if the transmission collision is identified during the predetermined period of time.

* * * * *